Sept. 26, 1967     M. BOBO ETAL     3,343,806
ROTOR ASSEMBLY FOR GAS TURBINE ENGINES
Filed May 27, 1965     2 Sheets-Sheet 1
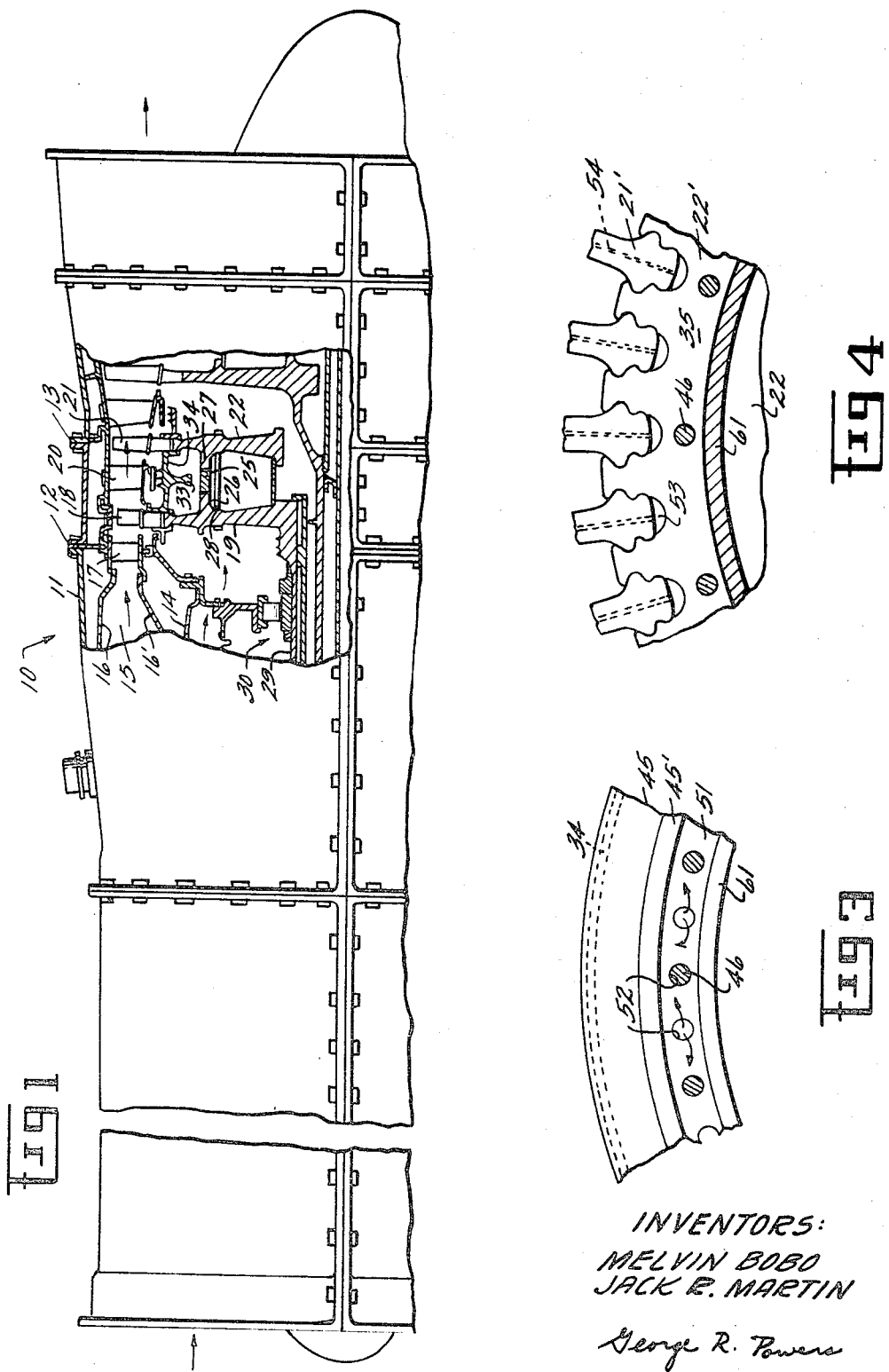
INVENTORS:
MELVIN BOBO
JACK R. MARTIN
George R. Powers
ATTORNEY

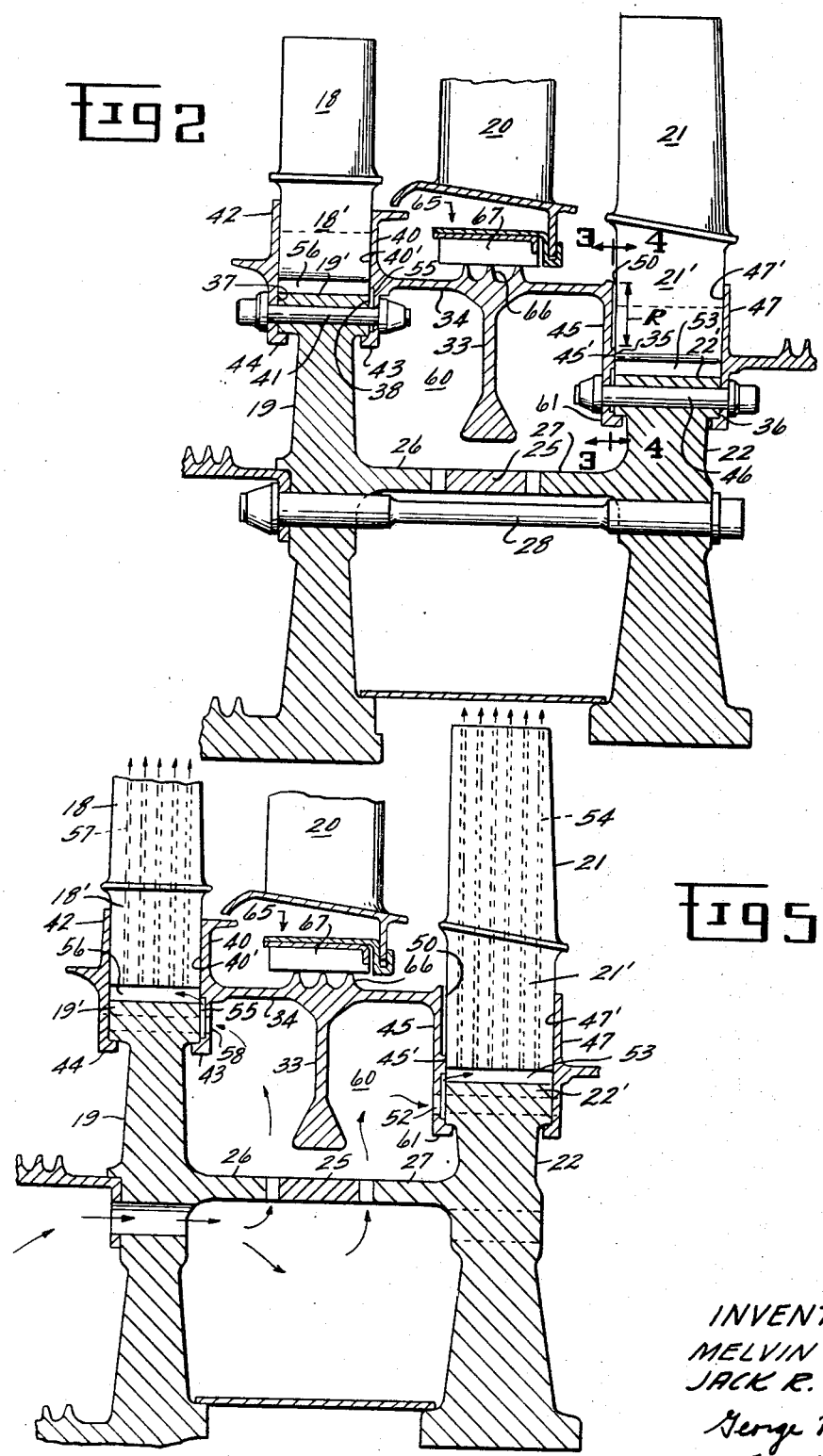

United States Patent Office 3,343,806
Patented Sept. 26, 1967

3,343,806
ROTOR ASSEMBLY FOR GAS TURBINE ENGINES
Melvin Bobo, Topsfield, and Jack R. Martin, Bedford, Mass., assignors to General Electric Company, a corporation of New York
Filed May 27, 1965, Ser. No. 459,207
12 Claims. (Cl. 253—39.1)

This invention relates to rotor assemblies for axial flow gas turbine engines and, more particularly, to turbine rotor assemblies having circumferential heat shielding arrangements for peripherally connecting blade carrying disks.

It is well known that the efficiency and output of a gas turbine engine can be increased by increasing the operating temperature of the turbine. As a practical matter, however, the turbine operating temperature, and hence the efficiency and output of the engine, is limited by the high temperature capabilities of the various turbine elements. As a result, considerable effort has been expended toward increasing the high temperature capabilities of turbine elements. Some increase in efficiency and output has been obtained by the development and use of new materials capable of withstanding higher temperatures. Even these new materials are not, however, generally capable of withstanding the extremely high temperatures desired in modern gas turbines. Consequently, various shielding arrangements have been used for maintaining the structural elements of the turbine at temperatures at which their materials have adequate strength to resist loads imposed during operation. These shielding arrangements are used to shield the rotor disks and the interconnecting rotor structure from the high temperature combustion products driving the turbine and to direct cooling air to the structural elements.

This cooling is generally accomplished by means of pressurized air bled from either the compressor or a low temperature portion of the combustor. Since the engine performance theoretically possible is reduced by the bleeding off of cooling air, it is imperative that the cooling air be used effectively, lest the decrease in efficiency caused by extraction of the air be greater than the increase resulting from the higher turbine operating temperature. This means that such shielding arrangements must be efficient from the standpoint of minimizing the quantity of cooling air required to cool satisfactorily the structural elements. To accomplish this, the arrangement must be effective in preventing excessive leakage of cooling air since leakage can necessitate the use of larger quantities of air. In addition, leakage can disrupt and dilute the normal flow of combustion product in the gas turbine.

In addition to providing cooling without excessive leakage, a shielding arrangement should have a high degree of structural reliability. This reliability is not always easily attained in practice since at least a portion of the shielding structure is exposed to the high temperature gases during turbine operation and since the arrangement, as a part of the rotor assembly, is driven at high rotary speeds. In particular, this high speed operation can create extremely high "hoop" stresses in the shielding structure. The combined stresses, including the 'hoop' stresses, present during operation in a high temperature environment may become too great for the member to withstand. More specifically, shielding arrangements may be subject to high speed rupture, slow permanent deformations such as "creep," and various types of fatigue failures, including cracking and pitting.

It is therefore an object of this invention to provide an improved shielding arrangement for gas turbine engines.

Another object of this invention is to provide in a high temperature turbomachine an improved shielding arrangement for shielding the rotor elements from high temperature gases and for directing cooling air to the rotor elements.

A further object is to provide for a high temperature turbine rotor assembly a shielding arrangement by which cooling air is utilized in a highly effective manner and by which undesirable leakage is minimized.

A still further object is to provide in a high temperature turbine rotor a heat shielding arrangement having a high degree of structural reliability.

Another object is to provide in a high temperature turbine rotor a heat shielding arrangement having relatively low stress levels.

Yet another object of this invention is to provide an improved heat shielding arrangement that is relatively simple and inexpensive to manufacture.

Briefly stated, in carrying out the invention in one form, a circumferential shielding arrangement is provided for peripherally connecting axially spaced blade carrying disks of a turbine rotor. The shielding arrangement is an integral structure comprising a retaining disk axially spaced between an adjacent pair of blade carrying disks and a cylindrical shield peripherally formed on the retaining disk. Suitable means are provided for flexibly interconnecting the cylindrical shield and the blade carrying disks to provide both sealing against radial leakage and substantially free expansion and contraction of the shield relative to the disks. The interconnecting structure includes radially disposed annular plates or flanges integrally formed with the shield and fastening means for securing the plates to the disks. By a further aspect of the invention, the mating seal surfaces between at least one of the plates and the associated blade carrying disk are offset radially from the cylindrical shield, the plate being spaced axially from the disk in the radial vicinity of the shield so as to permit axial expansion and contraction of the heat shield through axial flexing of the plate.

While the invention is distinctly claimed and particularly pointed out in the appended claims, the invention, both as to organization and content, will be better understood and appreciated, along with other objects and features thereof, from the following detailed description when taken in conjunction with the drawings, in which:

FIG. 1 is a view partially in cross-section, of a gas turbine engine utilizing the present invention;

FIG. 2 is an enlarged view of the portion of the turbine of FIG. 1 illustrating the heat shielding arrangement of this invention;

FIG. 3 is a view taken along the line 3—3 of FIG. 2;

FIG. 4 is a view taken along line 4—4 of FIG. 2; and

FIG. 5 is a view similar to FIG. 2 illustrating the normal flow of cooling air in the rotor assembly of this invention.

Referring first to FIG. 1, a portion of a high performance gas turbine engine 10 is illustrated, the engine 10 having an outer cylindrical casing 11 composed of annular segments secured together by suitable fastening means at circumferential flanges 12 and 13. An annular combustor is formed between the cylindrical casing 11 and an inner annular wall 14, and a pair of annular liners 16 and 16' are located within the combustor to define an annular burning zone 15. An annular nozzle diaphragm indicated generally by the numeral 17 is located at the downstream end of the burning zone 15 for receiving high temperature products of combustion therefrom and for directing the high temperature gases to an annular row of turbine buckets indicated generally by the numeral 18, the circumferentially spaced turbine buckets 18 being peripherally mounted on a turbine wheel or disk 19. From the turbine buckets 18, the combustion gases are discharged to a second annular nozzle diaphragm 20 which, in a manner similar to the nozzle diaphragm 17, directs the hot gases to a circumferential row of turbine buckets 21 carried by a second turbine wheel or disk 22 spaced axially downstream from the first turbine disk 19. These blade carrying disks 19 and 22 are interconnected by means of a torque transmitting coupling comprising an annular torque ring 25 and annular axially projecting rings 26 and 27 carried by the disks 29 and 22, respectively. The torque ring 25 and the disk rings 26 and 27 have axial projections which interlock to form a positive circumferential engagement between the disks 19 and 22, and a plurality of circumferentially spaced axial tie bolts 28 hold the torque ring 25 and the disk rings 26 and 27 in axial abutment at all times to maintain the disks 19 and 22 in fixed axial, radial, and circumferential positions relative to each other. In this manner, a rigid turbine rotor assembly is formed for driving a compressor (not shown) through a shaft 29 integrally connected to the upstream disk 19, the shaft 29 being rotatably mounted within the engine 10 by suitable means including a bearing arrangement 30.

In the high performance gas turbine engine 10, the products of combustion passing through the turbine buckets 18 and 21 are at higher temperatures than the buckets and the structural elements of the turbine rotor assembly can withstand for any reasonable length of time without cooling. Accordingly, it is necessary in practice to provide suitable means for maintaining the operating temperatures of the various elements at suitable levels. The novel heat shielding arrangement of the present invention provides this cooling function in a highly effective and structurally reliable manner, the arrangement being shown in detail by FIG. 2. With reference to FIG. 2, an integral heat shielding structure is illustrated, the structure comprising a disk 33 axially spaced between the blade carrying disks 19 and 22 and a cylindrical shield 34 integrally formed with and peripherally connected to the disk 33. The shield 34 extends axially upstream and axially downstream from the disk 33 to the peripheral rims 19' and 22' of the disks 19 and 22, respectively. Each of the rims 19' and 22' has accurately and smoothly finished, radially disposed upstream and downstream faces, the upstream face 35 of the rim 22' being illustrated by FIG. 4 by way of example.

Returning now to FIG. 2, an annular, radially disposed flange or plate 40 is carried by the upstream end of the shield 34 and is formed integrally therewith, the plate 40 having a face 40' axially abutting the downstream face 38 of the rim 22'. The face 40' also abuts accurately and smoothly finished downstream ends of the bucket roots 18' and is secured to the rim 19' by suitable fastening means such as a plurality of circumferentially spaced bolts 41. The bolts 41 also secure an annular pate 42 to the upstream face 37 of the rim 19'. In this manner, the annular plates 40 and 42 shield the rim 19' and the bucket roots 18' from direct contact with the hot combustion gases. Also, because of the accurate abutment between the plates 40 and 42, the faces 38 and 37, and the bucket roots 18', radial leakage between the rim 19' and the plates 40 and 42 is essentially prevented. In addition to these sealing surfaces, leakage is further prevented by rabbeted connections 43 and 44 between the plates 40 and 42, respectively, and the rim 19', the primary function of these rabbeted connections being to assure proper radial alignment between the disk 19 and the plates 40 and 42 at all times.

At the axially downstream end of the cylindrical shield 34 is another annular radially disposed flange or plate 45 formed integrally with the shield 34. The plate 45 is joined to upstream face 35 of the rim 22' by bolts 46 in a manner similar to that by which the plate 40 is attached to the rim 19'. A plate 47 is also secured to the downstream face 36 of the rim 22' by the bolts 46, the plate 47 having a smoothly finished face 47' which cooperates with the downstream face 36 of the rim 22' and the downstream ends of the bucket roots 21' to seal against radial leakage therebetween.

As illustrated by FIGS. 2 and 3, the annular plate 45 also has an accurately and smoothly finished, radially disposed sealing surface 45' which cooperates with the upstream face 35 of the rim 22' and the upstream ends of the bucket roots 25 to provide sealing between the plate 45 and the rim 22'. The annular surface 45' on the plate 45 is, however, spaced radially inward from the cylindrical shield 34 a substantial distance R such that an axial space 50 is provided between the radially outer portion of the plate 45 and the upstream face 35 of the rim 22'. This radial offset between the shield 34 and the surface 45' and the accompanying axial clearance between the plate 45 and the rim 22' are provided to permit thermal expansion and contraction of the heat shielding structure during turbine operation, the plate 45 flexing axially so that the cylindrical shield 34, which is directly exposed to the high temperature gases, can expand and contract in a substantially unrestrained manner relative to the torque transmitting coupling which is, as will be explained, maintained at a much lower temperature by cooling air. By permitting this free expansion and contraction, thermal stresses are avoided in the heat shielding structure and redundancy in the rotor assembly is avoided since the turbine disks 19 and 22 are structurally connected rigidly by only the torque ring 25.

As just described, the heat shielding structure shields the turbine rotor assembly, including the turbine disks 19 and 22 and the torque ring 25, and the bucket roots 18' and 21' from direct contact with the high temperature gases. In addition, it directs cooling air through the turbine rotor assembly and prevents excessive leakage. With respect to this cooling function, reference is now made to FIGS. 3–5. As illustrated, the plate 45 has an annular channel 51 formed therein radially inward of the sealing surface 45'. A plurality of circumferentially spaced holes 52 in the plate 45 open into this channel 51, the bolts 46 projecting through certain ones of the holes 52. The other holes 52 are unobstructed so as to permit flow of cooling air therethrough into the annular channel 51, FIG. 5 illustrating a cross-sectional cut through one of these unobstructed holes. The annular channel 51 is in turn in fluid communication with spaces 53 beneath the bucket roots 21', and these spaces are in fluid communication with cooling air passages 54 in the buckets 21. It will be noted that a similar annular channel 55 is provided in the plate 40 in fluid communication with spaces 56 beneath the bucket roots 18' and cooling air passage 57 in the buckets 18. The plate 40 also has holes 58 therein for the passage of cooling air.

Referring now to FIGS. 1 and 5, the cooling air flow during turbine operation will be described. Relatively cool compressed air is bled from the downstream end of the combustor through openings in the inner annular wall 14. The extracted air flows through openings (not shown) between adjacent tie bolts 28 in the turbine disk 19 and then passes outwardly through small spaces between the abutting and interlocking axial projections of the torque ring 25 and the mating rings 26 and 27 into the annular space 60 where the turbine disks 19 and 22 and the disk 33 are bathed in the relatively cool air. From the space 60, controlled quantities of cooling air are ducted through the openings 52 in the plate 45 and the openings 58 in the plate 40 to cool the turbine buckets 18 and 21. These openings in the plates 40 and 45 are carefully sized so that sufficient, but not excessive, quantities of cooling air are supplied to the buckets 18 and 21. Careful sizing of the holes in the plates 40 and 45 in combination with effective sealing between the plates and the associated rims will assure that excessive quantities of air are not used. The sealing between the plates and the rims is essential since the cooling air in the space 60 is at a substantially higher pressure than the combustion gases outwardly of the shield 34. After passing through the buckets 18 and 21, the cooling air is discharged in the stream of high temperature combustion products.

Turning attention now to FIGS. 1 and 2, it will be seen that the entire heat shielding structure, including the disk 33, is supported from the disks 19 and 22 by the annular plates 40 and 45. During high speed turbine operation, however, the disk 33 maintains low "hoop" stresses in the cylindrical shield 34. This occurs because the disk 33, which is relatively massive compared to the shield 34, is maintained at a relatively low temperature by the cooling air in the space 60. As a result, the disk 33 does not expand to any great extent during turbine operation and by being integrally formed with the shield 34 prevents radially outward deflection or bowing of the shield 34 due to centrifugal forces. Consequently, the centrifugal loads which would otherwise appear as "hoop" stresses in the shield 34 are taken primarily by the massive, lowly stressed disk 33 which operates in a low temperature environment. By thus maintaining low "hoop" stresses as well as low thermal stresses, the shielding arrangement of this invention has a high degree of structural reliability.

As the high temperature combustion products flow through the turbine nozzle diaphragms 17 and 20, there is a significant pressure drop across each diaphragm. By way of example, the pressure upstream of the diaphragm 20 as viewed in FIG. 2 may be twice as great as the pressure downstream of the diaphragm. Consequently, to assure that the entire flow of motive fluid passes through the diaphragm 20, sealing means must be provided to prevent axial leakage around the diaphragm 20. To prevent this undesired leakage, an annular sealing assembly 65 is utilized, the sealing assembly 65 including circumferential seal teeth 66 on the outer surface of the shield 34 and an annular ring 67 of suitable mating material, such as expanded honeycomb material, carried by the diaphragm 20. Because of the novel heat shielding arrangement supporting the sealing teeth 66, this sealing assembly 65 has several distinct advantages over other sealing arrangements. First of all, since the shield 34 is restrained against outward movement by the disk 33, the teeth 66 will not shift position to any great extent during turbine operation. As a result, small seal clearances are maintained with correspondingly small leakage. Secondly, the relatively massive and cool retaining disk 33 serves as a heat sink for conducting heat away from the teeth 66. This helps protect the teeth 66 against severe high temperature transients. Thirdly, the shield 34 may be operated at a relatively large radius since its stresses are held at a low level. This means that the sealing assembly 65 also operates at a relatively large radius and, therefore, that the radial length of the diaphragm 20 across which differential pressure loads exist is minimized. Consequently, bending loads on the diaphragm 20 are held to a minimum.

It will therefore be seen that an improved shielding arrangement has been provided for shielding the rotor elements of a high temperature turbo-machine from hot gases and for directing cooling air to the rotor elements. In addition, the shielding arrangement provides effective sealing against leakage and has a high degree of structural reliability due in large measure to low stress levels.

While a particular embodiment of this invention has been shown and described, it will be understood that various changes and modifications may be made without departing from the spirit and scope of the invention, and it is intended to cover all such equivalent changes and modifications by the appended claims.

What is claimed as new and is desired to secure by Letters Patent of the United States is:

1. In an axial flow gas turbine, a rotor assembly comprising:
    first and second blade carrying disks in axially spaced relationship,
    a third disk intermediate said first and second disks,
    an annular ring member integrally formed with said third disk at the outer periphery thereof,
    said annular ring member including a cylindrical shield extending axially between said first and second blade carrying disks, a first radially disposed plate adjacent said first disk, and a second radially disposed plate adjacent said second disk,
    the surface at which at least one of said plates is secured to the associated disk being radially spaced a substantial distance from the cylindrical shield,
    and fastening means flexibly securing said first and second plates to said first and second disks, respectively, to provide both sealing against radial leakage therebetween and substantially free axial movement between said annular ring member and said first and second disks, with said third disk restraining said cylindrical shield against outward bowing during turbine operation.

2. In an axial flow high temperature turbine, a rotor assembly comprising:
    a first disk having a plurality of turbine buckets peripherally mounted thereon,
    a second disk axially downstream of said first disk in spaced relationship thereto, said second disk having a plurality of turbine buckets peripherally mounted thereon,
    a third disk intermediate said first and second disks in axially spaced relationship therewith,
    an annular ring member integrally formed with said third disk at the outer periphery thereof,
    said annular ring member including a cylindrical shield extending axially between said first and second disks adjacent the peripheries thereof, a first radially disposed annular plate at the upstream end of said shield adjacent said first disk, and a second radially disposed annular plate at the downstream end of said shield adjacent said second disk,
    said first plate and said first disk having mating annular seal surfaces, and said second plate and said second disk having mating annular seal surfaces,
    the mating annular seal surfaces between at least one of said plates and the associated disk being radially spaced a substantial distance from said cylindrical shield,
    first fastening means securing said first plate to said first disk at the seal surfaces to provide sealing against radial leakage therebetween,
    and second fastening means securing said second plate to said second disk at the seal surfaces to provide sealing against radial leakage therebetween,
    said plate having the radially offset seal surface being spaced axially from the associated disk in the radial vicinity of said cylindrical shield and being relatively flexible so as to permit axial expansion and contraction of said ring member relative to said first and second disks during turbine operation, with said third disk restraining said cylindrical shield against outward bowing during turbine operation.

3. A turbine rotor assembly as defined by claim 2 in which cooling passages are provided in said first and second plates through which cooling air may be supplied to the turbine buckets carried by said first and second disks, respectively.

4. A turbine rotor assembly as defined by claim 2 in which said first and second plates are circumferentially rabbeted to said first and second disks, respectively, to accurately locate said annular ring relative to said first and second disks at assembly and during turbine operation.

5. A turbine rotor assembly as defined by claim 2 in which said third disk is massive relative to said cylindrical shield to provide restraint for said shield and to provide a heat sink for conducting heat from said shield during turbine operation.

6. A turbine rotor assembly as defined by claim 5 in which circumferentially extending sealing means is carried on the outer periphery of said shield for cooperating with stationary sealing means to provide sealing against axial leakage of high temperature fluid between said first and second disks.

7. In an axial flow high temperature turbine, a rotor assembly comprising:

a first disk having a plurality of turbine buckets peripherally mounted thereon, a second disk axially downstream of said first disk in spaced relationship thereto, said second disk having a plurality of turbine buckets peripherally mounted thereon, torque transmitting means rigidly interconnecting said first and second disks in fixed axial, radial, and circumferential positions relative to each other, a third disk intermediate said first and second disks in axially spaced relationship therewith, an annular ring member integrally formed with said third disk at the outer periphery thereof, said annular ring member including a cylindrical shield extending axially between said first and second disks adjacent the peripheries thereof, a first radially disposed annular plate at the upstream end of said shield adjacent said first disk, and a second radially disposed annular plate at the downstream end of said shield adjacent said second disk, said first plate and said first disk having mating annular seal surfaces, and said second plate and said second disk having mating annular seal surfaces, the mating annular seal surfaces between said second plate and said second disk being radially spaced a substantial distance from said cylindrical shield, first fastening means securing said first plate to said first disk at the seal surfaces to provide sealing against radial leakages therebetween, and second fastening means securing said second plate to said second disk at the seal surfaces to provide sealing against radial leakage therebetween, said second plate being spaced axially from said second disk in the radial vicinity of said cylindrical shield and being relatively flexible so as to permit axial expansion and contraction of said ring member relative to said torque transmitting means and said first and second disks during turbine operation, with said third disk restraining said cylindrical shield against outward bowing during turbine operation.

8. A turbine rotor assembly as defined by claim 7 in which cooling passages are provided in said first and second plates through which cooling air may be supplied to the turbine buckets carried by said first and second disks, respectively.

9. A turbine rotor assembly as defined by claim 7 in which said first and second plates are circumferentially rabbeted to said first and second disks, respectively, to accurately locate said annular ring relative to said first and second disks at assembly and during turbine operation.

10. A turbine rotor assembly as defined by claim 7 in which said third disk is massive relative to said cylindrical shield to provide restraint for said shield and to provide a heat sink for conducting heat from said shield during turbine operation.

11. A turbine rotor assembly as defined by claim 10 in which circumferentially extending sealing means is carried on the outer pheriphery of said shield for cooperating with stationary sealing means to provide sealing against axial leakage of high temperature fluid between said first and second disks.

12. A rotor assembly as defined in claim 1, wherein at least said one plate, having said surface secured to the associated disk at a radially spaced substantial distance from said shield, is spaced axially from the associated disk in the radial vicinity of said cylindrical shield so as to permit axial expansion and contraction of said ring member relative to said first and second disks during turbine operation.

References Cited
UNITED STATES PATENTS

| 2,557,747 | 6/1951 | Judson et al. | 253—39.15 |
| 2,860,851 | 11/1958 | Halford et al. | 253—39.15 |
| 3,034,298 | 5/1962 | White | 253—39.1 X |

MARTIN P. SCHWADRON, *Primary Examiner.*

SAMUEL FEINBERG, *Examiner.*

E. A. POWELL, JR., *Assistant Examiner.*